(12) United States Patent
Bao et al.

(10) Patent No.: US 10,894,325 B2
(45) Date of Patent: Jan. 19, 2021

(54) SOFT-BODIED FINGER, SOFT-BODIED GRIPPER AND SOFT-BODIED ROBOT

(71) Applicant: Suzhou Soft Robot Tech Co., Ltd., Zhangjiagang (CN)

(72) Inventors: Lei Bao, Beijing (CN); Shaolong Gao, Beijing (CN); Jia Yang, Beijing (CN)

(73) Assignee: Suzhou Soft Robot Tech Co., Ltd., Zhangjiagang (CN)

( * ) Notice: Subject to any disclaimer, the term of this patent is extended or adjusted under 35 U.S.C. 154(b) by 137 days.

(21) Appl. No.: 16/305,897

(22) PCT Filed: Jun. 30, 2017

(86) PCT No.: PCT/CN2017/091088
§ 371 (c)(1),
(2) Date: Nov. 30, 2018

(87) PCT Pub. No.: WO2018/001356
PCT Pub. Date: Jan. 4, 2018

(65) Prior Publication Data
US 2020/0215700 A1   Jul. 9, 2020

(30) Foreign Application Priority Data
Jul. 1, 2016   (CN) .......................... 2016 1 0515673

(51) Int. Cl.
*B25J 15/12*   (2006.01)
*B25J 15/00*   (2006.01)
(Continued)

(52) U.S. Cl.
CPC .......... *B25J 15/12* (2013.01); *B25J 15/0009* (2013.01); *B25J 9/142* (2013.01); *B25J 9/1612* (2013.01); *B25J 15/0023* (2013.01); *B25J 15/10* (2013.01)

(58) Field of Classification Search
CPC ...... B25J 15/0023; B25J 15/10; B25J 15/103; B25J 15/12; B25J 9/142
(Continued)

(56) References Cited

U.S. PATENT DOCUMENTS

| 3,343,864 A | 9/1967 | Baer |
| 3,981,528 A | 9/1976 | Freudenberg |

(Continued)

FOREIGN PATENT DOCUMENTS

| CN | 104015197 | 9/2014 |
| CN | 104015197 A1 | 9/2014 |

(Continued)

OTHER PUBLICATIONS

Search Report in European counterpart application No. 17819353.8, issued by EPO, dated Feb. 20, 2020.
(Continued)

*Primary Examiner* — Dean J Kramer
(74) *Attorney, Agent, or Firm* — Zhu Lehnhoff LLP

(57) ABSTRACT

A dual-channel soft-bodied finger includes a fingertip, a finger junction, and a fingerboard. A plurality of flexible joints and a plurality of flexible shoulders are disposed at intervals on an upper portion of the fingerboard between the fingertip and the finger junction. A lower portion of the fingerboard is provided with a plurality of protrusions. An end portion of the finger junction is a convex annular-shaped body. A transition segment between the end portion of the finger junction and the flexible joints is a cone-shaped body. A first air channel and a second air channel are disposed inside the finger, and when the first and second air channels are inflated, air is guided into an air bag through the first and second air channels.

10 Claims, 10 Drawing Sheets

(51) Int. Cl.
  *B25J 9/14* (2006.01)
  *B25J 9/16* (2006.01)
  *B25J 15/10* (2006.01)

(58) Field of Classification Search
  USPC ..................................................... 294/119.3
  See application file for complete search history.

(56) References Cited

U.S. PATENT DOCUMENTS

| | | | | |
|---|---|---|---|---|
| 4,815,782 A | * | 3/1989 | Craig | ................ B25J 15/12 |
| | | | | 294/119.3 |
| 5,156,081 A | * | 10/1992 | Suzumori | ............... B25J 15/12 |
| | | | | 91/525 |
| 8,550,519 B2 | | 10/2013 | Mankame et al. | |
| 2014/0360358 A1 | * | 12/2014 | Tell | ................ B25J 15/12 |
| | | | | 92/174 |
| 2016/0075036 A1 | | 3/2016 | Lessing et al. | |
| 2016/0114482 A1 | | 4/2016 | Lessing et al. | |
| 2016/0136820 A1 | | 5/2016 | Lessing et al. | |
| 2016/0375590 A1 | | 12/2016 | Lessing et al. | |

FOREIGN PATENT DOCUMENTS

| | | | | |
|---|---|---|---|---|
| CN | 104608140 A1 | 5/2015 | | |
| CN | 104959992 | 10/2015 | | |
| CN | 104959992 A1 | 10/2015 | | |
| CN | 106003131 A1 | 10/2016 | | |
| CN | 205704256 | 11/2016 | | |
| CN | 205704256 B1 | 11/2016 | | |
| CN | 205704257 | 11/2016 | | |
| CN | 205704257 B1 | 11/2016 | | |
| CN | 205704258 | 11/2016 | | |
| CN | 205704258 B1 | 11/2016 | | |
| DE | 102009058653 A1 | * | 6/2011 | .......... B25J 17/0275 |
| SU | 1521586 | 11/1989 | | |

OTHER PUBLICATIONS

English Translation of ISR for PCT/CN2017/091088 dated Sep. 22, 2017.
Chinese Search Report dated Jul. 1, 2016.
Search Report in Chinese counterpart application No. 201610515673, by SIPO, Jul. 1, 2016.

* cited by examiner

SOFT-BODIED FINGER, SOFT-BODIED GRIPPER AND SOFT-BODIED ROBOT

TECHNICAL FIELD

The present invention relates to a soft-bodied finger, particularly to a soft-bodied finger with dual-channel, as well as a soft-bodied robot in which soft-bodied finger(s) is (are) constituted into various configurations, for example, a dual-finger robot, a tri-finger robot, a four-finger robot or a multi-finger robot designed according to an operating environment.

BACKGROUND

Flexibility is one natural and universal attribute which is important for organisms. Most organisms have soft tissues. Such organisms enable highly efficient and harmonious interaction with the natural world by relying on the flexibility thereof. A "soft-bodied" robot also can change its shape, rigidity and movement, actively or passively, just like the organisms, so as to interact with the environment in a more safe and efficient way. A conventional, flexible hinge-based robot achieves the objective of "flexibility" by relying on connections among a plurality of tiny, rigid units and a usage of rigid elements such as springs. However, a control manner of such robot has no substantial difference from that of a conventional rigid robot. As a result, although having solved some problems that existed in the rigid robot, such robot is still restricted to a certain degree and shall belong to a sort of "rigid robot".

SUMMARY

I. Objectives of the Present Invention

One of the objectives of the present invention is to design a dual-channel soft-bodied finger. The finger of the present invention is designed as a fold-like flexible structural body with laminated arrangement, and achieves posture deformation such as outward curving and inward curving by inflating or deflating channels inside the finger, so as to grasp or pick up an object.

II. Technical Solutions

The soft-bodied finger as designed in the present invention includes a fingertip, a finger junction, a flexible joint, a fingerboard and a flexible shoulder; wherein a plurality of flexible joints and a plurality of flexible shoulders are disposed at intervals on an upper portion of the fingerboard, between the fingertip and the finger junction;

an empty chamber inside the flexible joint is formed as an air bag, and an empty chamber inside the flexible shoulder is formed as an air channel communicated with the air bag;

wherein at least two groups of air channels are disposed in the soft-bodied finger.

Optionally, a lower portion of the fingerboard is provided with a plurality of protrusions.

Optionally, the protrusions have a wavy-line shape.

Optionally, each group of air channels continuously communicates with all the air bags.

Optionally, an end portion of the finger junction is a convex annular-shaped body, and a transition segment between the end portion of the finger junction and the flexible joint is a cone-shaped body.

Optionally, the soft-bodied finger is made of silicone rubber.

Optionally, a width and a length of the soft-bodied finger satisfy a relational expression of $b=4a/15$.

Optionally, a height of the flexible joint is larger than that of the flexible shoulder.

Optionally, both of a cross-sectional area and a volume of the air bag are larger than that of the air channel.

Optionally, both of a structural body of the fingertip and an empty chamber inside the fingertip are gradually converged towards the fingertip.

Another aspect of the present invention further provides a soft-bodied gripper including at least two soft-bodied fingers described above.

Optionally, the soft-bodied gripper includes: at least two airflow conducting valves, at least two charging connectors, and a holder, wherein the airflow conducting valves are fixedly mounted on the holder; each of the airflow conducting valves includes an upper valve head and a lower valve head, and a finger junction of one of the soft-bodied fingers is fixedly clamped between the upper valve head and the lower valve head; one of the charging connectors is mounted on the upper valve head, and is communicated with the air channel of the soft-bodied finger through a via hole at a center of the upper valve head.

Optionally, an end portion of the finger junction is a convex annular-shaped body, and a transition segment between the end portion of the finger junction and the flexible joint of the soft-bodied finger is a cone-shaped body; an inside of the upper valve head is provided with an elliptic cone-shaped convex lip, and an inside of the lower valve head is provided with an elliptic cone-shaped via hole and an inner boss; the cone-shaped body of the transition segment is clamped between the elliptic cone-shaped convex lip and the elliptic cone-shaped via hole, and the convex annular-shaped body of the end portion is fixedly limited inside the inner boss.

Optionally, the upper valve head and the lower valve head are fixed together by a screw.

Optionally, the holder is provided with at least two support arms, each of the support arms has one end connected to the holder and the other end on which one of the airflow conducting valves is mounted.

Optionally, the at least two support arms are uniformly distributed along a circumference of the holder.

Optionally, the holder is provided with a mounting panel through which the soft-bodied gripper is fixedly mounted on a soft-bodied robot.

Still another aspect of the present invention further provides a soft-bodied gripper including at least two soft-bodied fingers and at least two airflow conducting valves; wherein each of the airflow conducting valves includes an upper valve head and a lower valve head, an inside of the upper valve head is provided with an elliptic cone-shaped convex lip, and an inside of the lower valve head is provided with an elliptic cone-shaped via hole and an inner boss;

each of the soft-bodied fingers includes a finger junction having an end portion being a convex annular-shaped body and a transition segment being a cone-shaped body;

the cone-shaped body of the transition segment is clamped between the elliptic cone-shaped convex lip and the elliptic cone-shaped via hole, and the convex annular-shaped body of the end portion is fixedly limited inside the inner boss.

Yet another aspect of the present invention further provides a soft-bodied robot including one or more soft-bodied gripper described above.

Optionally, the soft-bodied robot includes one or more robot arm, and one or more of the soft-bodied grippers is mounted on each of the robot arms.

Optionally, the soft-bodied robot further includes a control device which independently controls each of the soft-bodied grippers.

Currently, industrial automatic production lines mostly are constituted by rigid structures only, which may cause local impacts when performing operations on a production object. In order to prevent the impact from damaging the production object or production equipments, or in order to improve a kinematic accuracy of the equipment or decrease a speed of the equipment when contacting the production object, the manufacturing cost may be significantly increased or the production efficiency may be reduced. The present invention can obtain a dual-finger, tri-finger and four-finger robot, and may be designed into a multi-finger robot according to usage environments by utilizing a holder, an airflow conducting valve and a dual-channel soft-bodied finger which are assembled together. The multi-finger robot of the present invention can replace end effectors of a conventional gripper for highly efficient and safe operations. It can achieve harmlessly grasping the production object while ensuring a grasping speed.

The multi-finger soft-bodied robot as designed in the present invention utilizes a holder which is connected to the upper valve head of the airflow conducting valve, and then connects the finger junction (2) of the dual-channel soft-bodied finger to the lower valve head of the airflow conducting valve. According to the usage environment, soft-bodied robots having various configurations may be assembled by modifying a configuration of the holder.

The holder provided with support arms arranged at a circumference allows the dual-channel soft-bodied fingers to be arranged at a circumference. That is to say, it may be assembled into a soft-bodied robot having circumferentially arranged multiple fingers, such as a soft-bodied tri-finger robot, a soft-bodied four-finger robot, a soft-bodied five-finger robot, a soft-bodied six-finger robot or a soft-bodied nine-finger robot.

III. Advantageous Effects

The dual-channel soft-bodied finger and the soft-bodied robot of the present invention are advantageous in that:

① Applicability: it achieves picking up an object in both row direction and circumferential direction by utilizing a connection between the airflow conducting valve and the soft-bodied finger with dual-channel, in conjunction with a holder, so as to allow the multi-finger soft-bodied robot to grasp "various types of" workpieces and to be applicable for "various types of" environments.

② Safety: the dual-channel soft-bodied finger is made of silicone rubber, and hence is harmless to the workpiece and safe for humans.

③ High response speed and grasping force: the soft-bodied finger operates by utilizing dual-air channel, and restricts the movement of the flexible joint by the fingerboard.

④ Low cost: it utilizes a well-developed injection molding process without the need of large-size industrial processing equipment, which reduces the production cost for manufacturing the soft-bodied robot.

⑤ Simplicity: the dual-channel soft-bodied finger, the holder and the airflow conducting valve are designed as modules which can be easily assembled, used, maintained and replaced.

⑥ The soft-bodied multi-finger robot of the present invention breaks the restrictions in conventional mechanisms and control methods, adopts soft-bodied materials (with a young's modulus smaller than 1 Mpa), and achieves innovations in terms of manufacturing process and driving method by pneumatically controlling a movement of a four-finger robot. The finger is made of soft materials by casting, and hence entirely exhibits sufficient flexibility; an appearance and air chambers of the finger are appropriately designed to possess excellent properties, which allow for good applicability and safety during interaction with humans and workpieces.

⑦ The soft-bodied multi-finger robot of the present invention has advantages such as simple structure, high flexibility, large power to weight ratio, small weight, and low cost. As compared with the rigid gripper, the soft-bodied robot has no limits in terms of structures such as connecting rods, hinges and motors in the rigid gripper, and doesn't have complicated control system, either; as a result, it has irreplaceable superiority when grasping a workpiece which is fragile or has complicated shape.

⑧ The soft-bodied multi-finger robot of the present invention achieves posture deformation of the finger by means of an externally provided air source, so as to pick up and release an entity which has a spherical shape, a sheet shape, a cube shape, a bore spine surface and various types of complicated profiles.

It should be appreciated that, the foregoing generic description and the following detailed explanation are merely illustrative but not to limit the present invention.

BRIEF DESCRIPTION OF THE DRAWINGS

Hereinafter the drawings necessary for the description of the embodiments or the prior art will be briefly introduced for the purpose of more clearly explaining the technical solutions of the embodiments in the present invention or in the prior art. Obviously, the drawings described as below are merely some embodiments of the present invention, from which those skilled in the art would conceive of other figures without any creative labors.

Figure 1:
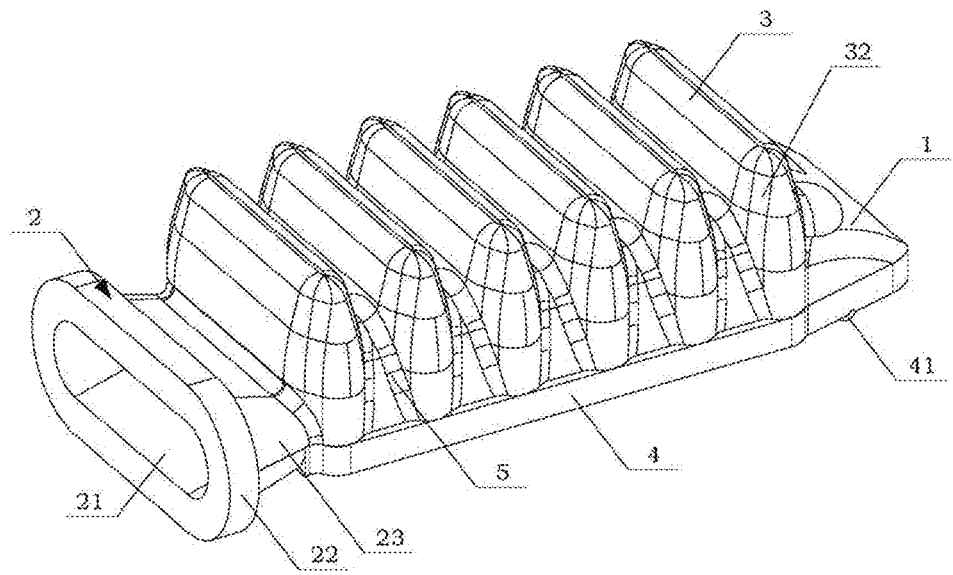
FIG. 1 is a schematic view illustrating an external structure of a dual-channel soft-bodied finger as designed in the present invention.

REFERENCE NUMERALS 1. fingertip; 2. finger junction; 21. air inlet; 22. convex annular-shaped body; 23. cone-shaped body; 3. flexible joint; 31. air bag; 32. arched segment; 33. joint supporter; 4. fingerboard; 41. protrusion; 5. flexible shoulder; 6. A air channel; 7. B air channel; 1A. A dual-channel soft-bodied finger; 1B. B dual-channel soft-bodied finger; 1C. C dual-channel soft-bodied finger; 1D. D dual-channel soft-bodied finger; 1E. E dual-channel soft-bodied finger; 1F. F dual-channel soft-bodied finger; 1G G dual-channel soft-bodied finger; 1H. H dual-channel soft-bodied finger; 1I. I dual-channel soft-bodied finger; 2A. A charging connector; 2B. B charging connector; 2C. C charging connector; 2D. D charging connector; 2E. E charging connector; 2F. F charging connector; 2G. G charging connector; 2H. H charging connector; 2I. I charging connector; 3A. A holder; 3A1. mounting panel; 3A2. A support arm; 3A3. B support arm; 3B. B holder; 3B1. mounting panel; 3B2. C support arm; 3B3. D support arm; 3B4. E support arm; 3C. C holder; 3C1. mounting panel; 3C2. F support arm; 3C3. G support arm; 3C4. H support arm; 3C5. I support arm; 4A. A airflow conducting valve; 4A1. A upper valve head; 4A1A. AA threaded hole; 4A1B. AA elliptic cone-shaped convex lip; 4A1C. upper valve panel; 4A1D. AA airflow channel; 4A2. A lower valve head; 4A2A. AA inner boss; 4A2B. AA hollow cone body; 4A2C. lower valve panel; 4A2D. AA elliptic cone-shaped via hole; 4B. B airflow conducting valve; 4B1. B upper valve head; 4B2. B lower valve head; 4C. C airflow conducting valve; 4C1. C upper valve head; 4C2. C lower valve head; 4D. D airflow conducting valve; 4D1. D upper valve head; 4D2. D lower valve head; 4E. E airflow conducting valve; 4E1. E upper valve head; 4E2. E lower valve head; 4F. F airflow conducting valve; 4F1. F upper valve head; 4F2. F lower valve head; 4G G airflow conducting valve; 4G1. G upper valve head; 4G2. G lower valve head; 4H. H airflow conducting valve; 4H1. H upper valve head; 4H2. H lower valve head; 4I. I airflow conducting valve; 4I1. I upper valve head; 4I2. I lower valve head.

DETAILED DESCRIPTION

Hereinafter, the present invention will be described in more details with reference to the drawings and the particular embodiments so that those skilled in the art may understand the technical solutions of the present invention in a better way.

The Dual-Channel Finger

In order to achieve flexible grasping in a more gentle, efficient and safe way, the embodiments of the present invention, first of all, provide a soft-bodied finger which achieves curving and stretching out of the finger by inflating and deflating an inner bag, so as to grasp various types of objects with regular shape and irregular shape or amorphous objects, in a more gentle, more natural, and more flexible manner.

Under normal conditions, an extremely shallow recess will be formed between adjacent two air bags. In order to inflate/deflate each of the air bags, one conventional means is to form an extremely small via hole in a bottom side of the recess. It's virtually impossible for the recess to be too thick or too deep (which may affect a degree of freedom of stretching out of the finger), thus the via hole for air channel is usually very small, which may considerably affect an air inflation/deflation efficiency and also result in an unacceptable response speed of the finger.

For more details, as illustrated in FIG. 1, FIG. 1A, FIG. 1B, FIG. 1C and FIG. 1D, the embodiment of the present invention provides a soft-bodied finger, including a fingertip 1, a finger junction 2, a flexible joint 3, a fingerboard 4 and a flexible shoulder 5; wherein a plurality of flexible joints 3 and a plurality of flexible shoulders 5 are disposed at intervals on an upper portion of the fingerboard 4, between the fingertip 1 and the finger junction 2; an empty chamber inside the flexible joint 3 is formed into an air bag 31, an empty chamber inside the flexible shoulder 5 is formed into an air channel communicated with the air bag 31; wherein the soft-bodied finger is provided with at least two groups of air channels.

The arrangement of dual-air channel obviously increases a cross-sectional area for air flowing, so as to significantly promote a throughput of air inflation/deflation of the air bag in the finger, thereby improving the air inflation/deflation efficiency and increasing the response speed of the finger.

Optionally, the dual-channel soft-bodied finger is an integrally formed structural body. The dual-channel soft-bodied finger is manufactured by processing silicon rubber materials, and hence has a soft-bodied property. In the present invention, the dual-channel soft-bodied finger is manufactured by adopting M4641 silicon rubber which is commercially available from the Waker corporation.*

The flexible joints 3 and the flexible shoulders 5 are disposed at intervals on an upper portion of the fingerboard 4, and a lower portion of the finger board 4 is provided with a plurality of wavy-line shaped protrusions 41. The protrusions 41 are configured to increase a friction force with an object when picking up the object.

Figure 1A:
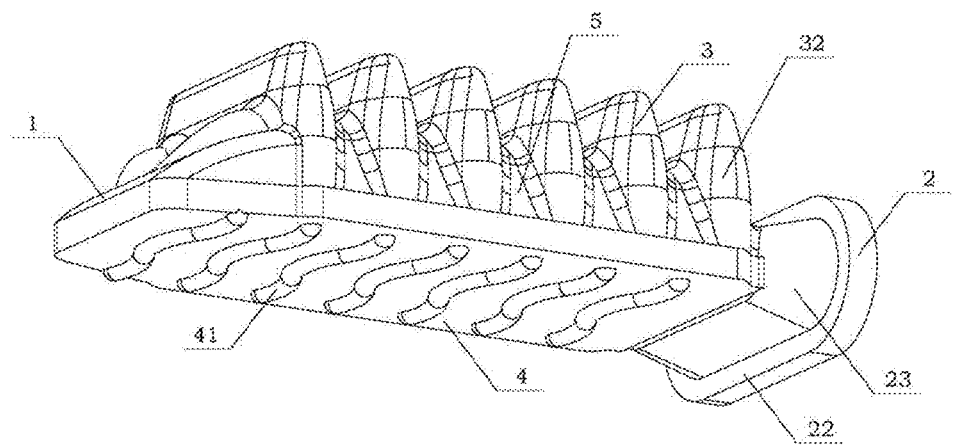
FIG. 1A is a schematic view illustrating an external structure of the dual-channel soft-bodied finger as designed in the present invention from another viewing angle.
Figure 1B:
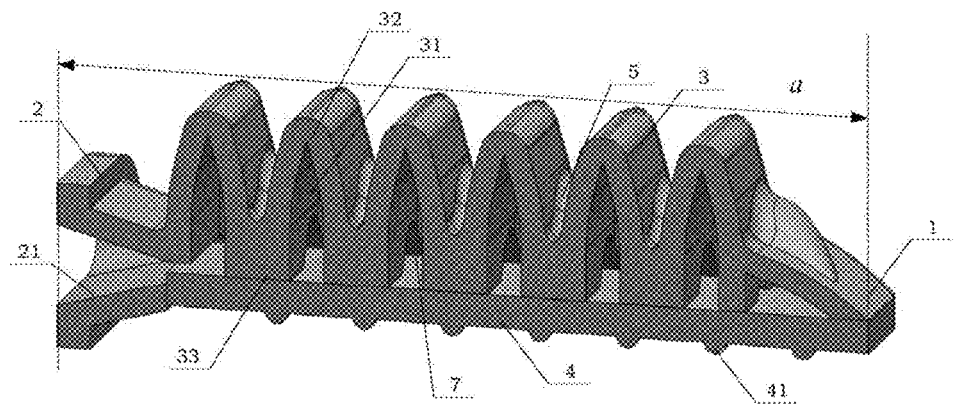
FIG. 1B is a schematic view illustrating a cross-sectional structure along an axial direction of the dual-channel soft-bodied finger as designed in the present invention.
Figure 1C:
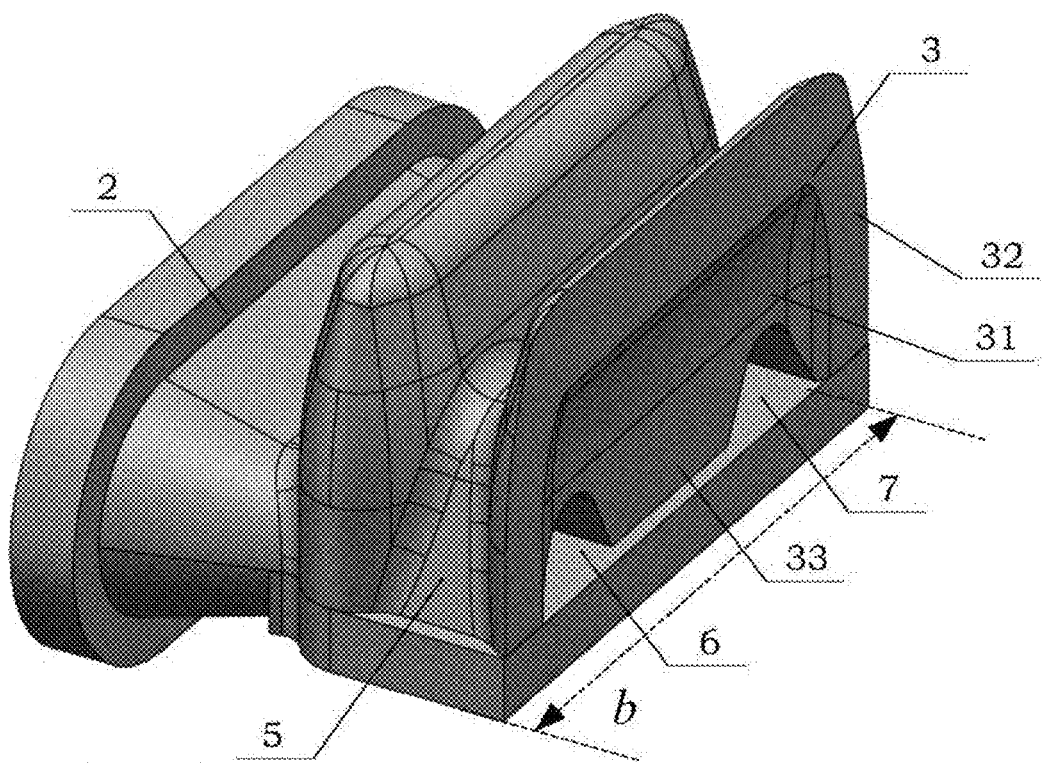
FIG. 1C is a schematic view illustrating a cross-sectional structure along a longitudinal direction of a flexible joint in the dual-channel soft-bodied finger as designed in the present invention.
Figure 1D:
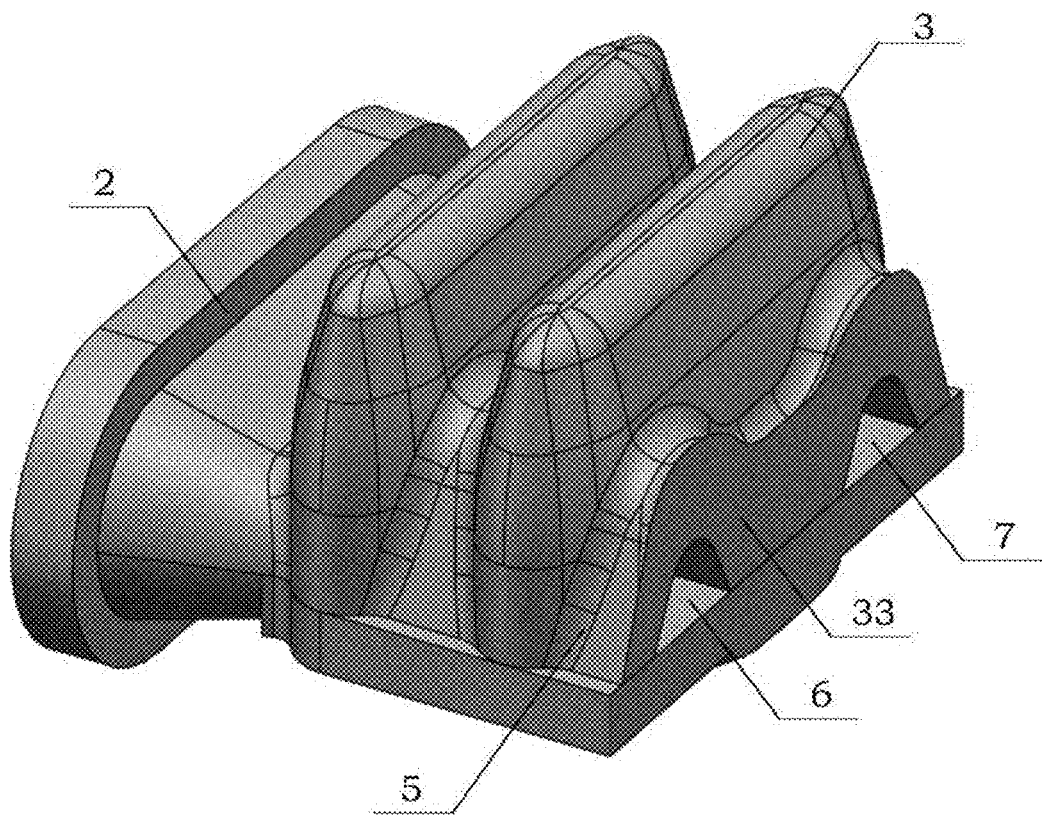
FIG. 1D is a schematic view illustrating a cross-sectional structure along a longitudinal direction of a flexible shoulder in the dual-channel soft-bodied finger as designed in the present invention.

As illustrated in FIG. 1B, FIG. 1C and FIG. 1D, an A air channel 6 and a B air channel 7 are disposed inside the dual-channel soft-bodied finger as designed in the present invention. When inflating the A air channel 6 and the B air channel 7, air will be guided into the air bag 31 through the A air channel 6 and the B air channel 7.

As illustrated in FIG. 1, FIG. 1A, FIG. 1B, FIG. 1C and FIG. 1D, an arched segment 32 and a joint supporter 33 are disposed on the flexible joint 3; an inside of the flexible joint 3 has a structure of air bag 31 which is communicated with the A air channel 6 and the B air channel 7.

In the present invention, several flexible joints 3 are arranged in a laminated manner on the dual-channel soft-bodied finger to constitute a fold-like structural body. The air channel (6, 7) and the air bag 31 are inflated or deflated with compressed air provided by an external air pump, so as to achieve posture deformation such as outward curving and inward curving of the dual-channel soft-bodied finger, and hence achieve the objective of picking up an object.

In order to be adapted to grasp an object in a more safe way, as illustrated in FIG. 1B and FIG. 1C, given that a length of the dual-channel soft-bodied finger is denoted by a and a width of the dual-channel soft-bodied finger is denoted by b, then it satisfies b=4a/15.

Optionally, each group of air channels continuously communicates all of the air bags; a cross-sectional area and a volume of the air bag are larger than that of the air channel; a structural body of the fingertip and an empty chamber inside the fingertip both are gradually converged towards the fingertip. A height of the flexible joint is larger than that of the flexible shoulder. In order to increase the throughput of air inflation/deflation further by increasing the cross-sectional area of the air channel, as illustrated in FIG. 1D, the flexible shoulder can also be configured to have an undulate shape, for example, the air channel 6, 7 may be slightly protruded at top portion and both sides thereof so as to obtain two relatively spacious and symmetric air channels. Such dual-air channel can obtain a higher air inflation/deflation efficiency; at the same time, a wall thickness of the air channel is more uniform; and correspondingly, a pressure generated by the air inflation/deflation of each of the air bags in the finger will be more uniform and moderate, so as to minimize an influence to the deforming effect of the finger, to the greatest extent.

The Soft-Bodied Gripper

Another aspect of the present invention further provides a soft-bodied gripper, including at least two soft-bodied fingers and at least two airflow conducting valves; wherein each of the airflow conducting valves includes an upper valve head and a lower valve head, an inside of the upper valve head is provided with an elliptic cone-shaped convex lip, and an inside of the lower valve head is provided with an elliptic cone-shaped via hole and an inner boss;

each of the soft-bodied fingers includes a finger junction having an end portion which is a convex annular-shaped body, and having a transition segment which is a cone-shaped body;

the cone-shaped body of the transition segment is clamped between the elliptic cone-shaped convex lip and the elliptic cone-shaped via hole, and the convex annular-shaped body of the end portion is fixedly limited inside the inner boss.

As illustrated in FIG. 1, one end of the finger junction 2 is a convex annular-shaped body 22 which is engaged with the inner boss of the lower valve head; the transition segment between the end portion of the finger junction 2 and the flexible joint 3 is a cone-shaped body 21 which is inserted into the elliptic cone-shaped via hole of the lower valve head; and the elliptic cone-shaped convex lip of the upper valve head is inserted into an air inlet of the finger junction 2.

By means of a mutual cooperation among the cone-shaped bodies in the finger junction, the upper valve head and the lower valve head mentioned above, the finger junction can be more tightly and fixedly attached between the upper and lower valve head to ensure an air tightness of connecting portions. In addition, a cooperation between the convex annular-shaped body and the inner boss ensures mounting fastness and stability while further increasing the air tightness.

Preferably, each of the at least two soft-bodied fingers can be the dual-channel soft-bodied finger described in the foregoing embodiment. Of course, those skilled in the art will understand that, the soft-bodied finger in the soft-bodied gripper having such mounting structure is not intended to be limited to the dual-channel soft-bodied finger; actually, the above-mentioned mounting structure can be similarly applied into any soft-bodied finger having any number of air channels or having no air channel to achieve mounting with better air tightness and stability. Therefore, the foregoing dual-channel soft-bodied finger shall not be considered as constituting any limitation to the particular implementation of the technical solutions of the present application. For the mounting method by using the cooperation between cone-shaped structural bodies, it's applicable in any assembling solutions for devices having certain requirements on air tightness and stability.

Optionally, the soft-bodied gripper includes at least two airflow conducting valves, at least two charging connectors and a holder; wherein, the airflow conducting valve is fixedly mounted on the holder; each of the airflow conducting valves includes an upper valve head and a lower valve head, and a finger junction of one of the soft-bodied fingers is fixedly clamped between the upper valve head and the lower valve head; one of the charging connectors is mounted on the upper valve head, and the charging connector is communicated with the air channel of the soft-bodied finger through a via hole at a center of the upper valve head.

Optionally, an end portion of the finger junction is a convex annular-shaped body, and a transition segment between the end portion of the finger junction and the flexible joint is a cone-shaped body; an inside of the upper valve head is provided with an elliptic cone-shaped convex lip, and an inside of the lower valve head is provided with an elliptic cone-shaped via hole and an inner boss; the cone-shaped body of the transition segment is clamped between the elliptic cone-shaped convex lip and the elliptic cone-shaped via hole, and the convex annular-shaped body of the end portion is fixedly limited inside the inner boss.

Optionally, the upper valve head and the lower valve head are fixed together by a screw.

Optionally, the holder is provided with at least two support arms, each of the support arms has one end connected to the holder, and the other end on which one of the airflow conducting valves is mounted.

Optionally, the at least two support arms are uniformly distributed along a circumference of the holder.

Optionally, the holder is provided with a mounting panel through which the soft-bodied gripper is fixedly mounted on a soft-bodied robot.

Yet another aspect of the present invention further provides a soft-bodied robot including one or more soft-bodied gripper described above.

Optionally, the soft-bodied robot includes one or more robot arm, and one or more soft-bodied gripper is mounted on each of the robot arm.

Optionally, the soft-bodied robot further includes a control device which independently controls each of the soft-bodied grippers.

The first embodiment: a dual-channel soft-bodied dual-finger robot

Figure 2:
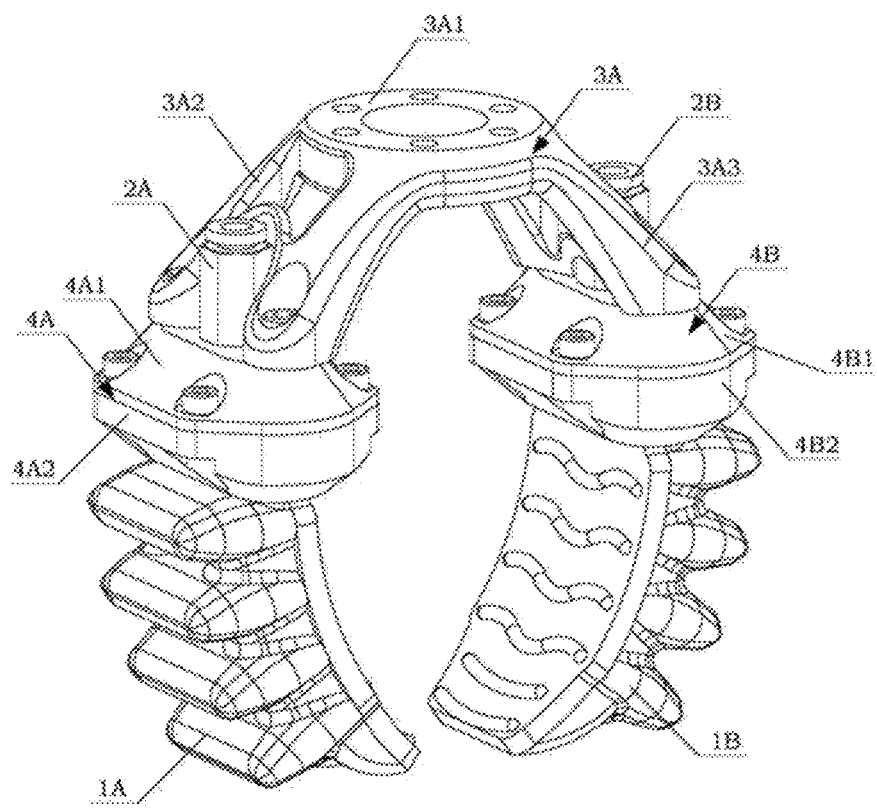
FIG. 2 is a structural diagram illustrating a grasping state of a dual-finger robot of the present invention.

An action of grasping an object by the dual-channel soft-bodied dual-finger robot as designed in the present invention is illustrated in FIG. 2. An action of supporting the object by the dual-channel soft-bodied dual-finger robot as designed in the present invention is illustrated in FIG. 2A.

Figure 2A:
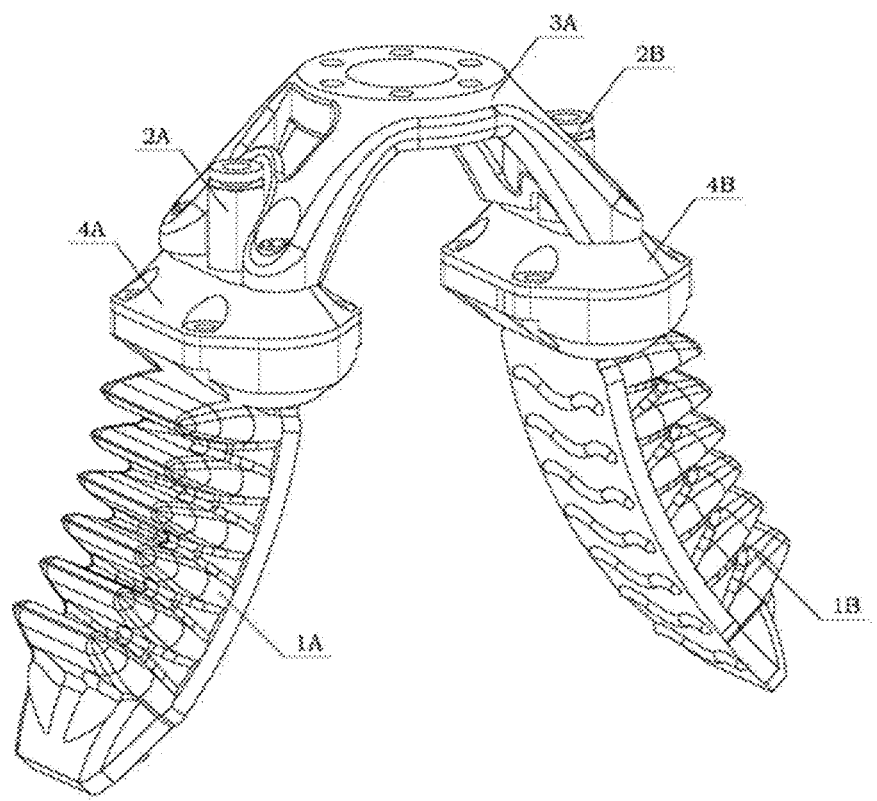
FIG. 2A is a structural diagram illustrating a supporting state of the dual-finger robot of the present invention.
Figure 2B:
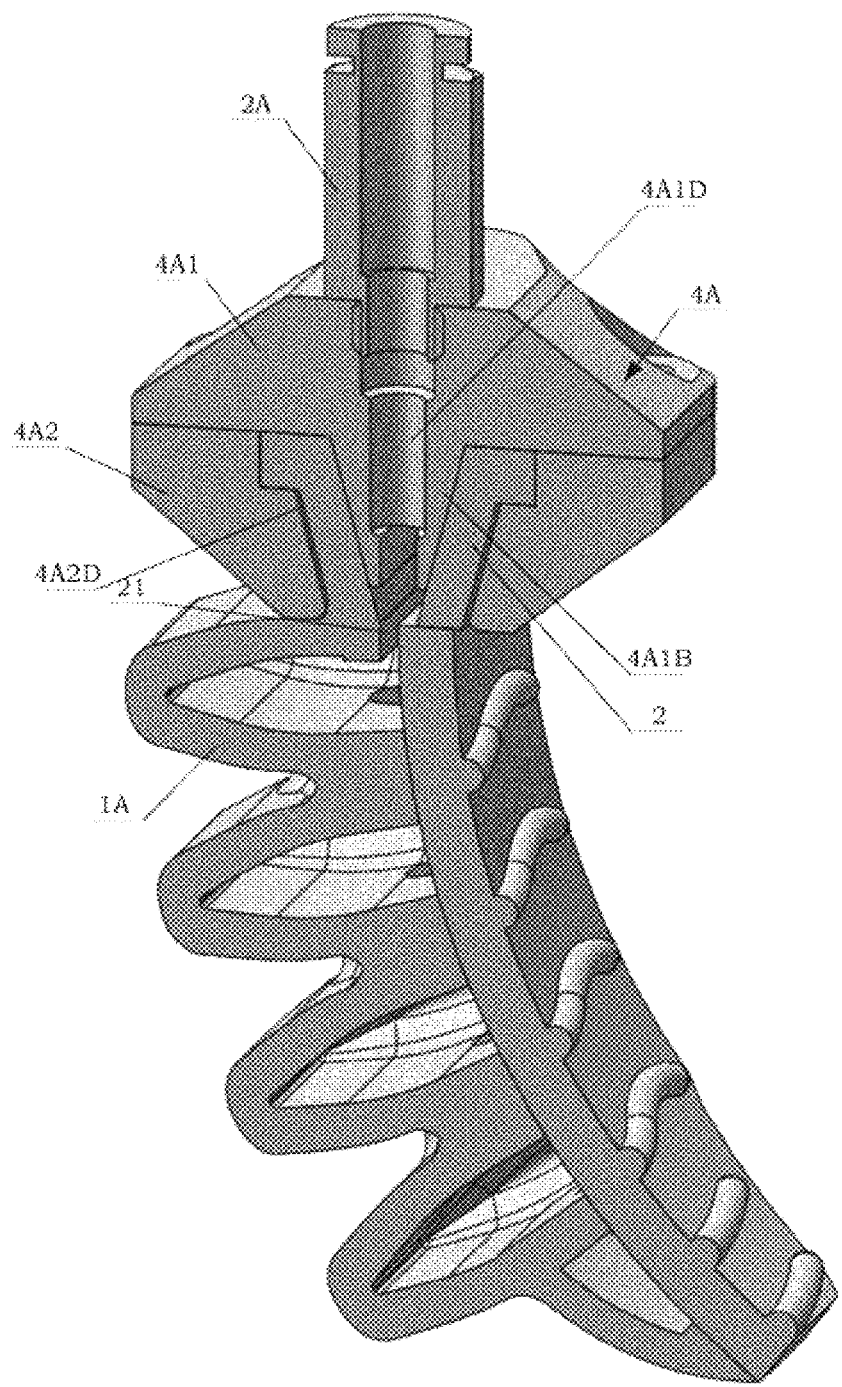
FIG. 2B is a cross-sectional view illustrating a dual-channel soft-bodied finger and an airflow conducting valve of the present invention which are assembled.

As illustrated in FIG. 2 and FIG. 2A, the dual-channel soft-bodied dual-finger robot as designed in the present invention includes an A dual-channel soft-bodied finger 1A, a B dual-channel soft-bodied finger 1B, an A airflow conducting valve 4A, a B airflow conducting valve 4B, an A charging connector 2A, a B charging connector 2B, and an A holder 3A; wherein the A dual-channel soft-bodied finger 1A and the B dual-channel soft-bodied finger 1B have the same structure; the A airflow conducting valve 4A and the B airflow conducting valve 4B have the same structure; and the A charging connector 2A and the B charging connector 2B have the same structure.

The structure of the A dual-channel soft-bodied finger 1A and the B dual-channel soft-bodied finger 1B is the same as that of the dual-channel soft-bodied finger illustrated in FIG. 1 and FIG. 1A.

Figure 2C:
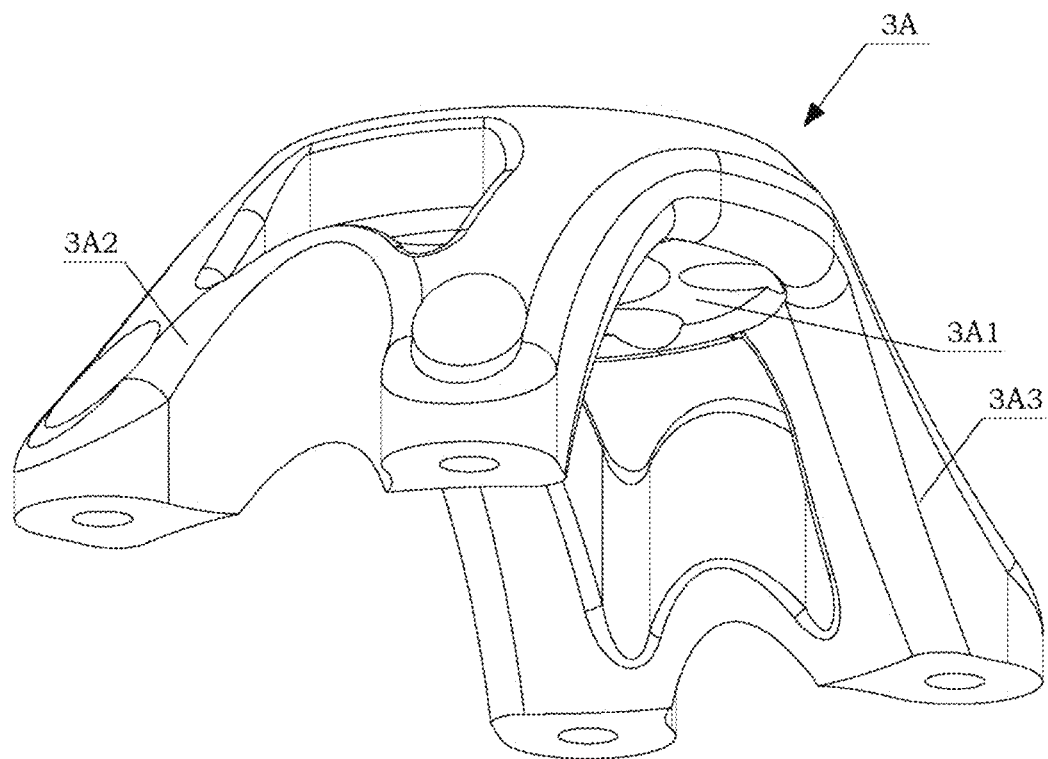
FIG. 2C is a structural diagram illustrating a holder in the dual-finger robot of the present invention.
Figure 2D:
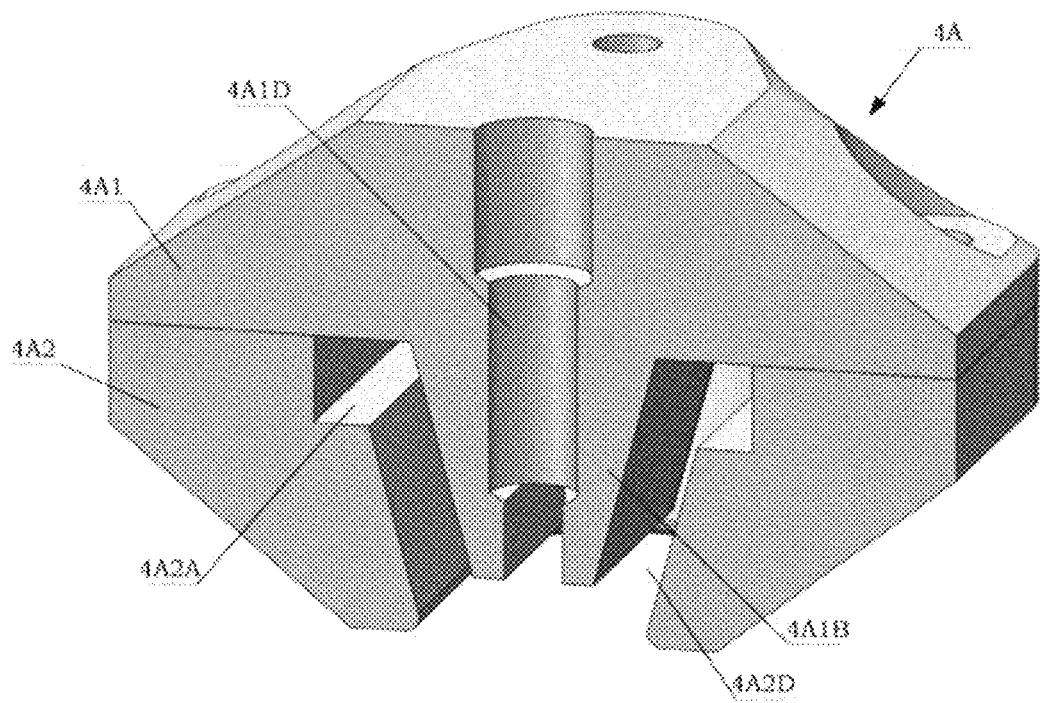
FIG. 2D is a cross-sectional view illustrating an airflow conducting valve of the present invention.
Figures 2E, 2F:
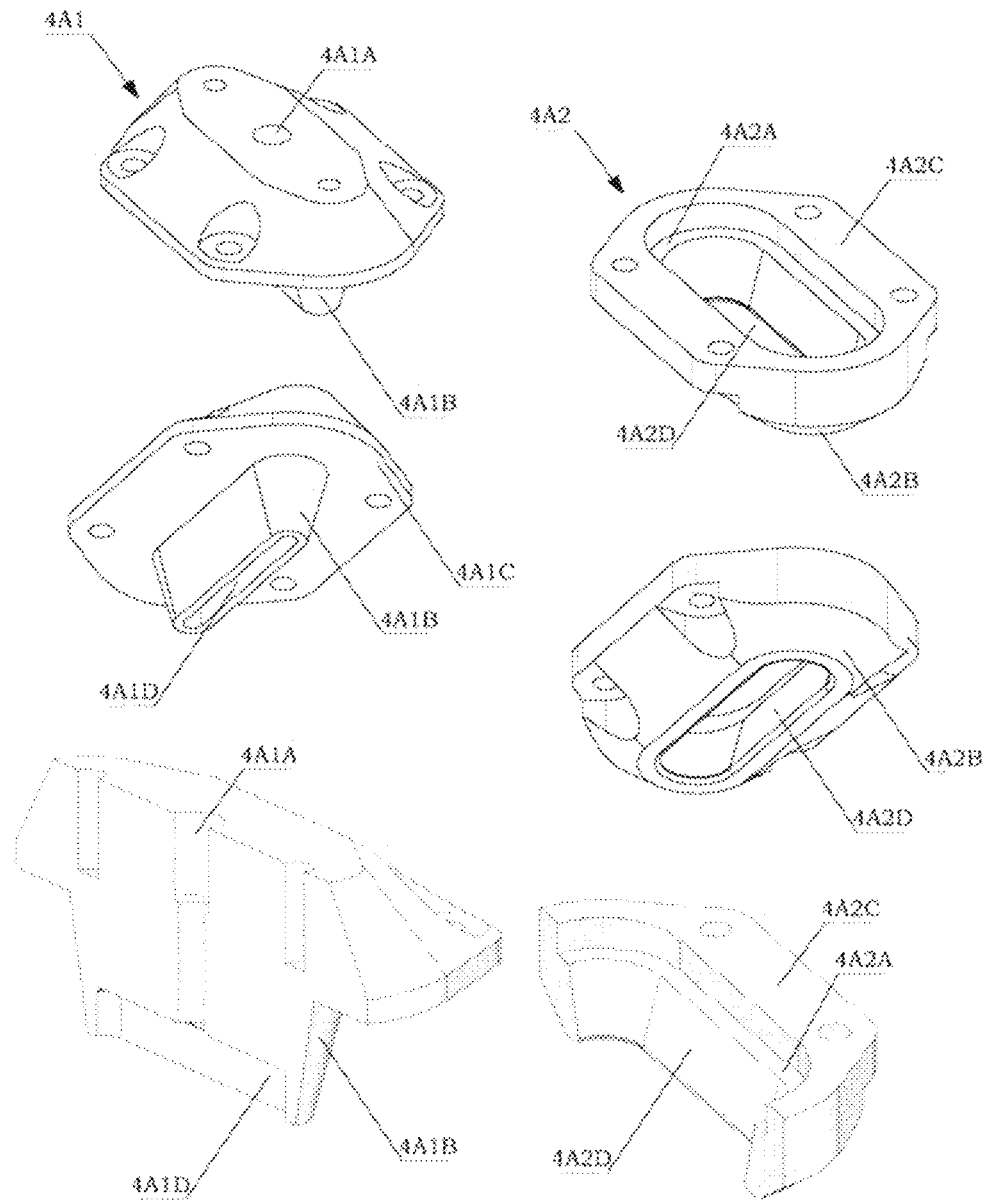
FIG. 2E is a structural diagram illustrating an upper valve head in the airflow conducting valve of the present invention from different viewing angles.
FIG. 2F is a structural diagram illustrating a lower valve head in the airflow conducting valve of the present invention from different viewing angles.

The structure of the A airflow conducting valve 4A and the B airflow conducting valve 4B is the same as that of the airflow conducting valve illustrated in FIG. 2D, FIG. 2E and FIG. 2F.

The A Holder 3A

As illustrated in FIG. 2, FIG. 2A and FIG. 2C, the A holder 3A is provided with a mounting panel 3A1, an A support arm 3A2, and a B support arm 3A3. The mounting panel 3A1 is configured to achieve fixing the dual-channel soft-bodied dual-finger robot with an external device; the A support arm 3A2 is configured to connect the A airflow conducting valve 4A; and the B support arm 3A3 is configured to connect the B airflow conducting valve 4B.

The A Airflow Conducting Valve 4A

As illustrated in FIG. 2B, FIG. 2D, FIG. 2E and FIG. 2F, the A airflow conducting valve 4A is constituted by an A upper valve head 4A1 and an A lower valve head 4A2; an A charging connector 2A is mounted on the A upper valve head 4A1; and a finger junction of the A dual-channel soft-bodied finger 1A is mounted below the A lower valve head 4A2.

One end of the A upper valve head 4A1 is provided with an AA threaded hole 4A1A for mounting the A charging connector 2A, the AA threaded hole 4A1A is disposed on an AA air channel 4A1D; the other end of the A upper valve head 4A1 is provided with an AA elliptic cone-shaped convex lip 4A1B; an upper valve panel 4A1C of the A upper valve head 4A1 is fixedly connected to a lower valve panel 4A2C of the A lower valve head 4A2. It can be seen from the cross-sectional structure (FIG. 2B, FIG. 2D, FIG. 2E and FIG. 2F) of the A upper valve head 4A1 that, a central portion of the A upper valve head 4A1 is provided with the AA air channel 4A1D; one end of the AA air channel 4A1D is the AA threaded hole 4A1A, and the other end of the AA air channel 4A1D is the AA elliptic cone-shaped convex lip 4A1B. The AA elliptic cone-shaped convex lip 4A1B is inserted in an air inlet of the finger junction of the A dual-channel soft-bodied finger 1A.

One end of the A lower valve head 4A2 is a lower valve panel 4A2C which is fixedly connected with the upper valve panel 4A1C of the A upper valve head 4A1 through screw; the other end of the A lower valve head 4A2 is an AA hollow cone-shaped body 4A2B. It can be seen from the cross-sectional structure (FIG. 2B, FIG. 2D, FIG. 2E and FIG. 2F) of the A lower valve head 4A2 that, a central portion of the A lower valve head 4A2 is provided with an AA elliptic cone-shaped via hole 4A2D and an AA inner boss 4A2A; the AA inner boss 4A2A is configured to support an convex annular-shaped body of the finger junction of the A dual-channel soft-bodied finger 1A. The AA elliptic cone-shaped via hole 4A2D is configured to allow the finger junction of the A dual-channel soft-bodied finger 1A to pass there-through.

The B Airflow Conducting Valve 4B

Referring to FIG. 2 and FIG. 2A, the B airflow conducting valve 4B is constituted by a B upper valve head 4B1 and a B lower valve head 4B2; a B charging connector 2B is mounted on the B upper valve head 4B1; and a finger junction of the B dual-channel soft-bodied finger 1B is mounted below the B lower valve head 4B2.

The B upper valve head 4B1 has the same structure with the A upper valve head 4A1, and will be explained with reference to FIG. 2D illustrating the A upper valve head 4A1. One end of the B upper valve head 4B1 is provided with an AB threaded hole for mounting the B charging connector 2B, the AB threaded hole is disposed on an AB air channel; the other end of the B upper valve head 4B1 is provided with an AB elliptic cone-shaped convex lip; an upper valve panel of the B upper valve head 4B1 is fixedly connected to a lower valve panel of the B lower valve head 4B2 through screw. It can be seen from the cross-sectional structure of the B upper valve head 4B1 that, a central portion of the B upper valve head 4B1 is provided with the AB air channel; one end of the AB air channel is the AB threaded hole, and the other end of the AB air channel is the AB elliptic cone-shaped convex lip. The AB elliptic cone-shaped convex lip is inserted in the air inlet of the finger junction of the B dual-channel soft-bodied finger 1B.

The B lower valve head 4B2 has the same structure with the A lower valve head 4A2, and will be explained with reference to FIG. 2D illustrating the A lower valve head 4A2. One end of the B lower valve head 4B2 is a lower valve panel which is fixedly connected with the upper valve panel of the B upper valve head 4B1 through screw; the other end of the B lower valve head 4B2 is an AB hollow cone-shaped body. It can be seen from the cross-sectional structure of the B lower valve head 4B2 that, a central portion of the B lower valve head 4B2 is provided with an AB elliptic cone-shaped via hole and an AB inner boss; the AB inner boss is configured to support a convex annular-shaped body of the finger junction of the B dual-channel soft-bodied finger 1B. The AB elliptic cone-shaped via hole is configured to allow the finger junction of the B dual-channel soft-bodied finger 1B to pass there-through.

The second embodiment: a dual-channel soft-bodied tri-finger robot

Figure 3:
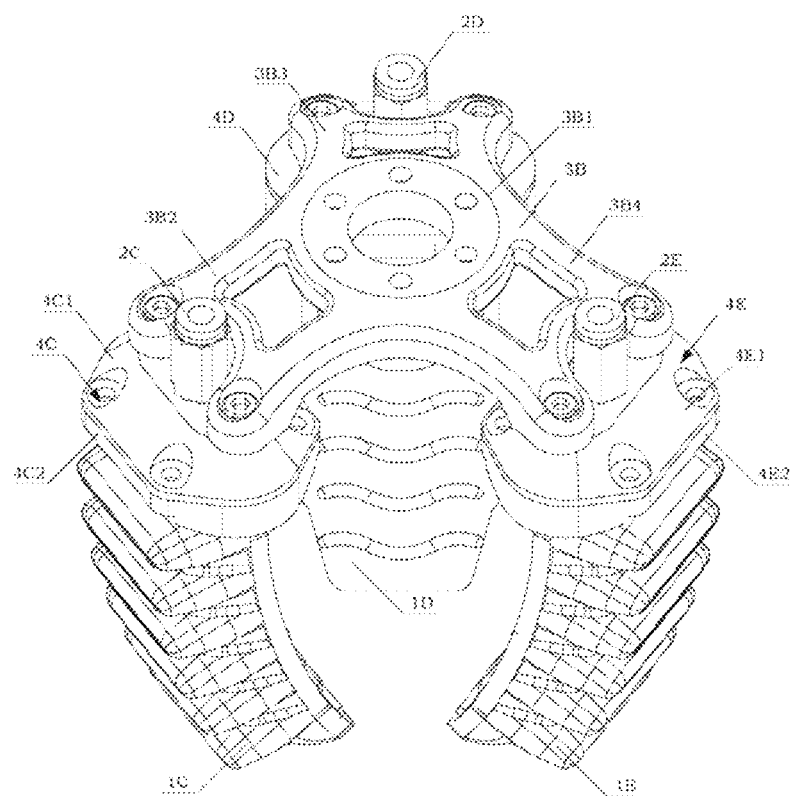
FIG. 3 is a structural diagram illustrating a grasping state of a tri-finger robot of the present invention.

An action of grasping an object by the dual-channel soft-bodied tri-finger robot as designed in the present invention is illustrated in FIG. 3. An action of supporting the object by the dual-channel soft-bodied tri-finger robot as designed in the present invention is illustrated in FIG. 3A.

Figure 3A:
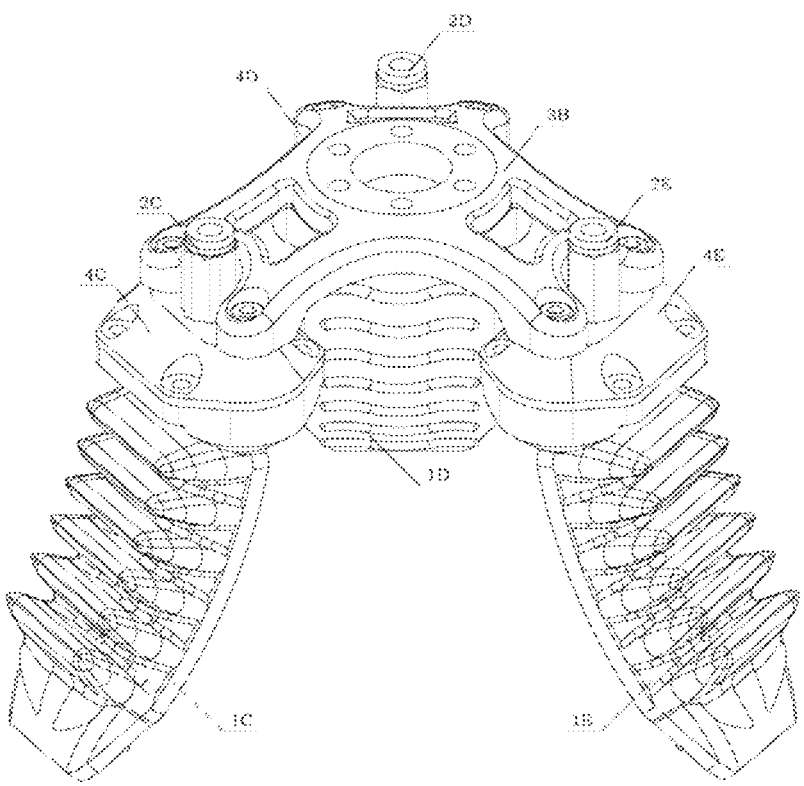
FIG. 3A is a structural diagram illustrating a supporting state of the tri-finger robot of the present invention.
Figure 3B:
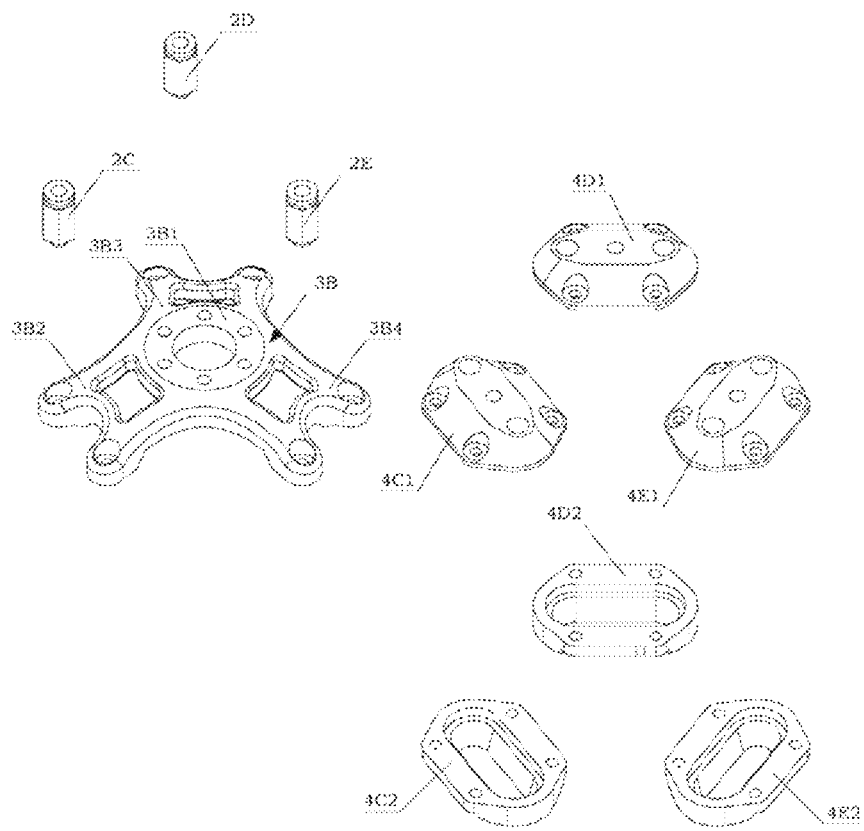
FIG. 3B is a structural diagram illustrating a holder and an airflow conducting valve in the tri-finger robot of the present invention.
Figure 3C:
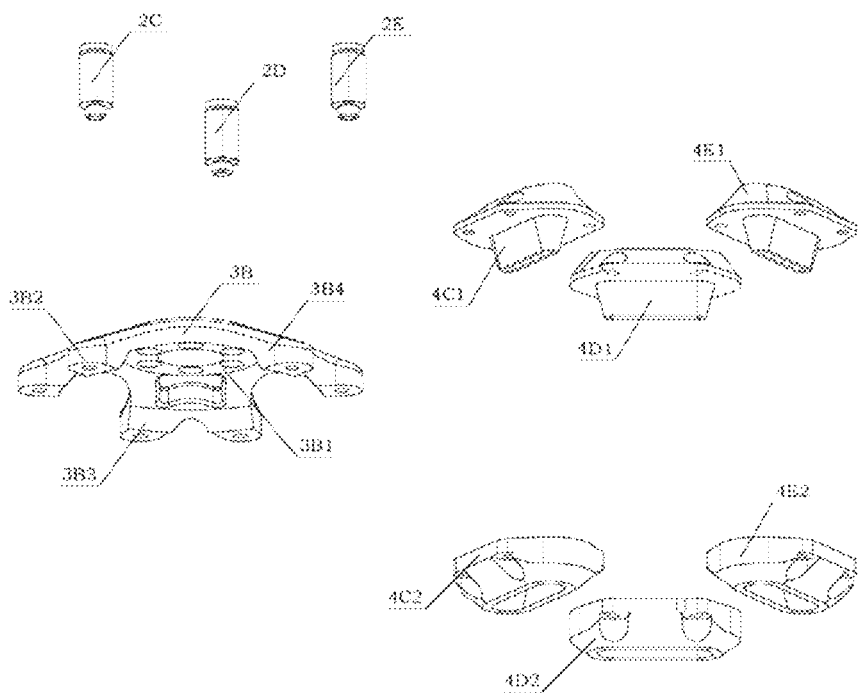
FIG. 3C is a structural diagram illustrating the holder and the airflow conducting valve in the tri-finger robot of the present invention from another viewing angle.

As illustrated in FIG. 3 and FIG. 3A, the dual-channel soft-bodied tri-finger robot as designed in the present invention includes a C dual-channel soft-bodied finger 1C, a D dual-channel soft-bodied finger 1D, an E dual-channel soft-bodied finger 1E, a C airflow conducting valve 4C, a D airflow conducting valve 4D, an E airflow conducting valve 4E, a C charging connector 2C, a D charging connector 2D, an E charging connector 2E, and a B holder 3B; wherein the C dual-channel soft-bodied finger 1C, the D dual-channel soft-bodied finger 1D and the E dual-channel soft-bodied finger 1E have the same structure; the C airflow conducting valve 4C, the D airflow conducting valve 4D and the E airflow conducting valve 4E have the same structure; and the C charging connector 2C, the D charging connector 2D and the E charging connector 2E have the same structure.

The structure of the C dual-channel soft-bodied finger 1C, the D dual-channel soft-bodied finger 1D and the E dual-channel soft-bodied finger 1E is the same as that of the dual-channel soft-bodied finger illustrated in FIG. 1 and FIG. 1A.

The structure of the C airflow conducting valve 4C, the D airflow conducting valve 4D and the E airflow conducting valve 4E is the same as that of the airflow conducting valve illustrated in FIG. 2D, FIG. 2E and FIG. 2F.

The B Holder 3B

As illustrated in FIG. 3, FIG. 3A, FIG. 3B and FIG. 3C, the B holder 3B is provided with a mounting panel 3B1, a C support arm 3B2, a D support arm 3B3 and an E support arm 3B4. The mounting panel 3B1 is configured to fix the dual-channel soft-bodied dual-finger robot with an external device; the C support arm 3B2 is configured to connect the C airflow conducting valve 4C; the D support arm 3B3 is configured to connect the D airflow conducting valve 4D; and the E support arm 3B4 is configured to connect the E airflow conducting valve 4E.

In the present invention, by extending the support arms at the circumference of the B holder 3B, a multi-finger soft-bodied robot including circumferentially arranged dual-channel soft-bodied fingers can be assembled, for example, a soft-bodied four-finger robot, a soft-bodied five-finger robot, a soft-bodied six-finger robot or a soft-bodied nine-finger robot.

The C Airflow Conducting Valve 4C

As illustrated in FIG. 3, FIG. 3A, FIG. 3B and FIG. 3C, the C airflow conducting valve 4C is constituted by a C upper valve head 4C1 and a C lower valve head 4C2; a C charging connector 2C is mounted on the C upper valve head 4C1; a finger junction of the C dual-channel soft-bodied finger 1C is mounted below the C lower valve head 4C2.

The C upper valve head 4C1 has the same structure with the A upper valve head 4A1, and will be explained with reference to FIG. 2D illustrating the A upper valve head 4A1. One end of the C upper valve head 4C1 is provided with an AC threaded hole for mounting the C charging connector 2C, the AC threaded hole is disposed on an AC air channel; the other end of the C upper valve head 4C1 is provided with an AC elliptic cone-shaped convex lip; an upper valve panel of the C upper valve head 4C1 is fixedly connected to a lower valve panel of the C lower valve head 4C2 through screw. It can be seen from the cross-sectional structure of the C upper valve head 4C1 that, a central portion of the C upper valve head 4C1 is provided with the AC air channel; one end of the AC air channel is the AC threaded hole, and the other end of the AC air channel is the AC elliptic cone-shaped convex lip. The AC elliptic cone-shaped convex lip is inserted in the finger junction of the C dual-channel soft-bodied finger 1C.

The C lower valve head 4C2 has the same structure with the A lower valve head 4A2, and will be explained with reference to FIG. 2D illustrating the A lower valve head 4A2. One end of the C lower valve head 4C2 is a lower valve panel which is fixedly connected with the upper valve panel of the C upper valve head 4C1 through screw; the other end of the C lower valve head 4C2 is an AC hollow cone-shaped body. It can be seen from the cross-sectional structure of the C lower valve head 4C2 that, a central portion of the C lower valve head 4C2 is provided with an AC elliptic cone-shaped via hole and an AC inner boss; the AC inner boss is configured to support a convex annular-shaped body of the finger junction of the C dual-channel soft-bodied finger 1C. The AC elliptic cone-shaped via hole is configured to allow the finger junction of the C dual-channel soft-bodied finger 1C to pass there-through.

The D Airflow Conducting Valve 4D

As illustrated in FIG. 3, FIG. 3A, FIG. 3B and FIG. 3C, the D airflow conducting valve 4D is constituted by a D upper valve head 4D1 and a D lower valve head 4D2; a D charging connector 2D is mounted on the D upper valve head 4D1; a finger junction of the D dual-channel soft-bodied finger 1D is mounted below the D lower valve head 4D2.

The D upper valve head 4D1 has the same structure with the A upper valve head 4A1, and will be explained with reference to FIG. 2D illustrating the A upper valve head 4A1. One end of the D upper valve head 4D1 is provided with an AD threaded hole for mounting the D charging connector 2D, the AD threaded hole is disposed on an AD air channel; the other end of the D upper valve head 4D1 is provided with an AD elliptic cone-shaped convex lip; an upper valve panel of the D upper valve head 4D1 is fixedly connected to a lower valve panel of the D lower valve head 4D2 through screw. It can be seen from the cross-sectional structure of the D upper valve head 4D1 that, a central portion of the D upper valve head 4D1 is provided with the AD air channel; one end of the AD airflow passage is the AD threaded hole, and the other end of the AD airflow passage is the AD elliptic cone-shaped convex lip. The AD elliptic cone-shaped convex lip is inserted in the finger junction of the D dual-channel soft-bodied finger 1D.

The D lower valve head 4D2 has the same structure with the A lower valve head 4A2, and will be explained with reference to FIG. 2D illustrating the A lower valve head 4A2. One end of the D lower valve head 4D2 is a lower valve panel which is fixedly connected with the upper valve panel of the D upper valve head 4D1 through screw; the other end of the D lower valve head 4D2 is an AD hollow cone-shaped body. It can be seen from the cross-sectional structure of the D lower valve head 4D2 that, a central portion of the D lower valve head 4D2 is provided with an AD elliptic cone-shaped via hole and an AD inner boss; the AD inner boss is configured to support a convex annular-shaped body of the finger junction of the D dual-channel soft-bodied finger 1D. The AD elliptic cone-shaped via hole is configured to allow the finger junction of the D dual-channel soft-bodied finger 1D to pass there-through.

The E Airflow Conducting Valve 4E

As illustrated in FIG. 3, FIG. 3A, FIG. 3B and FIG. 3C, the E airflow conducting valve 4E is constituted by an E upper valve head 4E1 and an E lower valve head 4E2; an E charging connector 2E is mounted on the E upper valve head 4E1; a finger junction of the E dual-channel soft-bodied finger 1E is mounted below the E lower valve head 4E2.

The E upper valve head 4E1 has the same structure with the A upper valve head 4A1, and will be explained with reference to FIG. 2D illustrating the A upper valve head 4A1. One end of the E upper valve head 4E1 is provided with an AE threaded hole for mounting the E charging connector 2E, the AE threaded hole is disposed on an AE air channel; the other end of the E upper valve head 4E1 is provided with an AE elliptic cone-shaped convex lip; an upper valve panel of the E upper valve head 4E1 is fixedly connected to a lower valve panel of the E lower valve head 4E2 through screw. It can be seen from the cross-sectional structure of the E upper valve head 4E1 that, a central portion of the E upper valve head 4E1 is provided with the AE air channel; one end of the AE air channel is the AE threaded hole, and the other end of the AE air channel is the AE elliptic cone-shaped convex lip. The AE elliptic cone-shaped convex lip is inserted in the finger junction of the E dual-channel soft-bodied finger 1E.

The E lower valve head 4E2 has the same structure with the A lower valve head 4A2, and will be explained with reference to FIG. 2D illustrating the A lower valve head 4A2. One end of the E lower valve head 4E2 is a lower valve panel which is fixedly connected with the upper valve panel of the E upper valve head 4E1 through screw; the other end of the E lower valve head 4E2 is an AE hollow cone-shaped body. It can be seen from the cross-sectional structure of the E lower valve head 4E2 that, a central portion of the E lower valve head 4E2 is provided with an AE elliptic cone-shaped via hole and an AE inner boss; the AE inner boss is configured to support a convex annular-shaped body of the finger junction of the E dual-channel soft-bodied finger 1E. The AE elliptic cone-shaped via hole is configured to allow the finger junction of the E dual-channel soft-bodied finger 1E to pass there-through.

The third embodiment: a dual-channel soft-bodied four-finger robot

Figure 4:
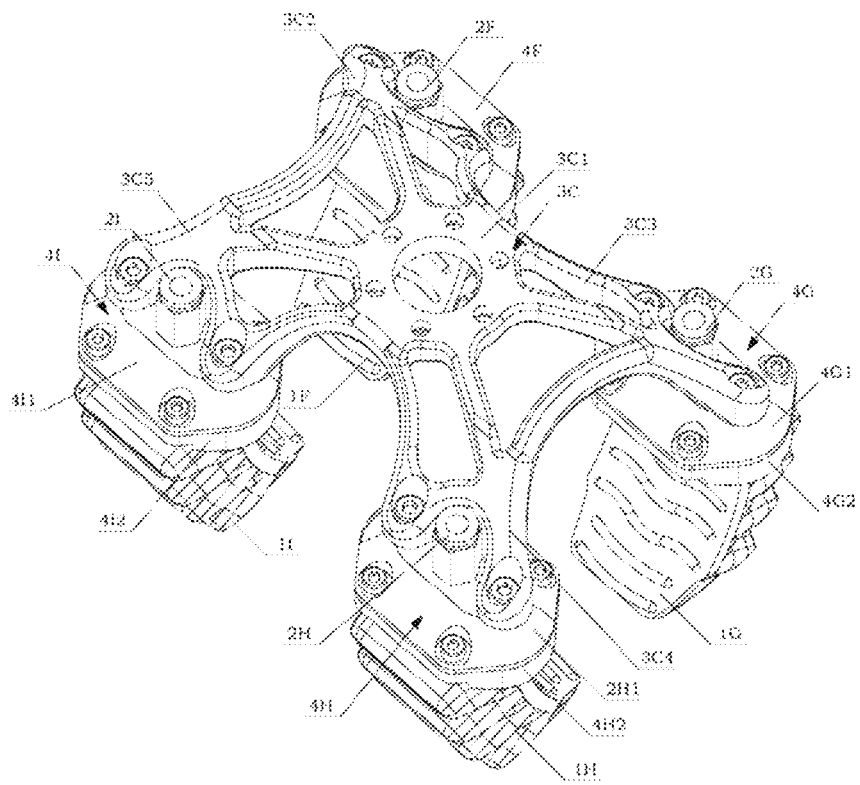
FIG. 4 is a structural diagram illustrating a grasping state of a four-finger robot of the present invention.
Figure 4A:
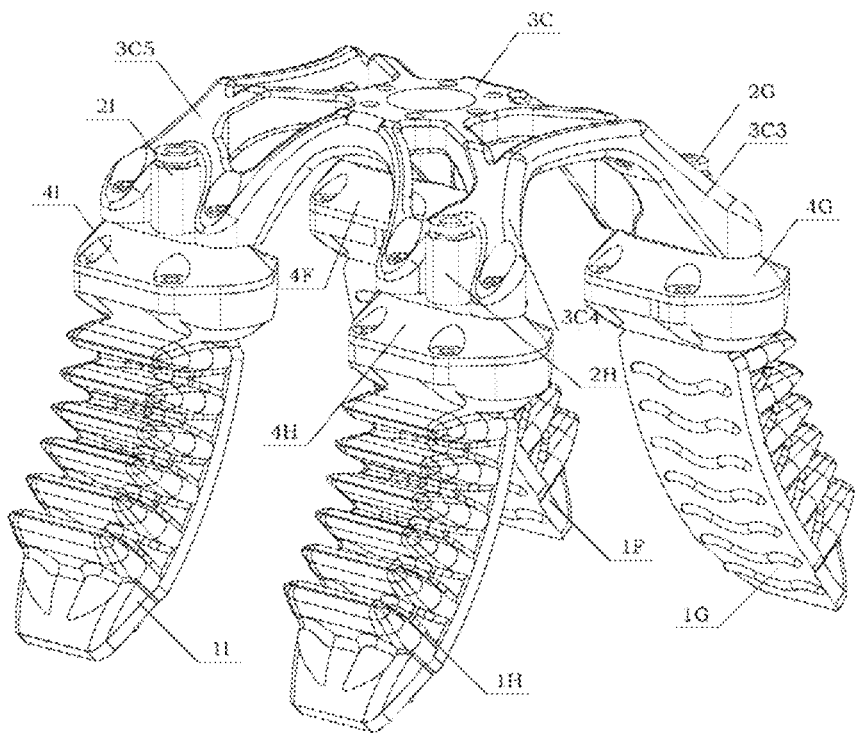
FIG. 4A is a structural diagram illustrating a supporting state of the four-finger robot of the present invention.

As illustrated in FIG. 4 and FIG. 4A, the dual-channel soft-bodied four-finger robot as designed in the present invention includes a F dual-channel soft-bodied finger 1F, a G dual-channel soft-bodied finger 1G; a H dual-channel soft-bodied finger 1H, an I dual-channel soft-bodied finger 1I, a F airflow conducting valve 4F, a G airflow conducting valve 4G; a H airflow conducting valve 4H, an I airflow conducting valve 4I, a F charging connector 2F, a G charging connector 2G; a H charging connector 2H, an I charging connector 2I, and a C holder 3C; wherein the F dual-channel soft-bodied finger 1F, the G dual-channel soft-bodied finger 1G; the H dual-channel soft-bodied finger 1H and the I dual-channel soft-bodied finger 1I have the same structure; the F airflow conducting valve 4F, the G airflow conducting valve 4G; the H airflow conducting valve 4H and the I airflow conducting valve 4I have the same structure; and the F charging connector 2F, the G charging connector 2G; the H charging connector 2H and the I charging connector 2I have the same structure.

The structure of the F dual-channel soft-bodied finger 1F, the G dual-channel soft-bodied finger 1G; the H dual-channel soft-bodied finger 1H and the I dual-channel soft-bodied finger 1I is the same as that of the dual-channel soft-bodied finger illustrated in FIG. 1 and FIG. 1A.

The structure of the the F airflow conducting valve 4F, the G airflow conducting valve 4G; the H airflow conducting valve 4H and the I airflow conducting valve 4I is the same as that of the airflow conducting valve illustrated in FIG. 2D, FIG. 2E and FIG. 2F.

The C Holder 3C

Figure 4B:
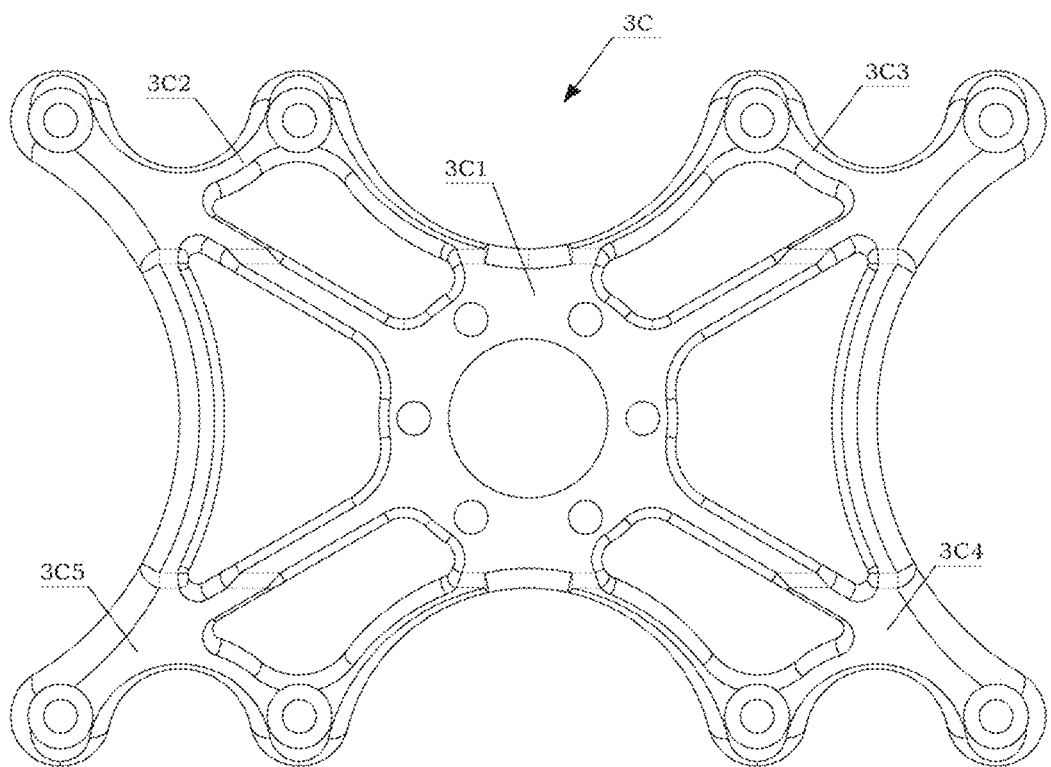
FIG. 4B is a structural diagram illustrating a holder in the four-finger robot of the present invention.

As illustrated in FIG. 4, FIG. 4A and FIG. 4B, the C holder 3C is provided with a mounting panel 3C1, a F support arm 3C2, and a G support arm 3C3, a H support arm 3C4 and an I support arm 3C5. The mounting panel 3C1 is configured to fix the dual-channel soft-bodied four-finger robot with an external device; the F support arm 3C2 is configured to connect the F airflow conducting valve 4F; the G support arm 3C3 is configured to connect the G airflow conducting valve 4G; the H support arm 3C4 is configured to connect the H airflow conducting valve 4H; and the I support arm 3C5 is configured to connect the I airflow conducting valve 4I.

The F Airflow Conducting Valve 4F

As illustrated in FIG. 4 and FIG. 4A, the F airflow conducting valve 4F is constituted by a F upper valve head 4F1 and a F lower valve head 4F2; a F charging connector 2F is mounted on the F upper valve head 4F1; a finger junction of the F dual-channel soft-bodied finger 1F is mounted below the F lower valve head 4F2.

The F upper valve head 4F1 has the same structure with the A upper valve head 4A1, and will be explained with reference to FIG. 2D illustrating the A upper valve head 4A1. One end of the F upper valve head 4F1 is provided with an AF threaded hole for mounting the F charging connector 2F, the AF threaded hole is disposed on an AF air channel; the other end of the F upper valve head 4F1 is provided with an AF elliptic cone-shaped convex lip; an upper valve panel of the F upper valve head 4F1 is fixedly connected to a lower valve panel of the F lower valve head 4F2 through screw. It can be seen from the cross-sectional structure of the F upper valve head 4F1 that, a central portion of the F upper valve head 4F1 is provided with the AF air channel; one end of the AF air channel is the AF threaded hole, and the other end of the AF air channel is the AF elliptic cone-shaped convex lip. The AF elliptic cone-shaped convex lip is inserted in the finger junction of the F dual-channel soft-bodied finger 1F.

The F lower valve head 4F2 has the same structure with the A lower valve head 4A2, and will be explained with reference to FIG. 2D illustrating the A lower valve head 4A2. One end of the F lower valve head 4F2 is a lower valve panel which is fixedly connected with the upper valve panel of the F upper valve head 4F1 through screw; the other end of the F lower valve head 4F2 is an AF hollow cone-shaped body. It can be seen from the cross-sectional structure of the F lower valve head 4F2 that, a central portion of the F lower valve head 4F2 is provided with an AF elliptic cone-shaped via hole and an AF inner boss; the AF inner boss is configured to support a convex annular-shaped body of the finger junction of the F dual-channel soft-bodied finger 1F. The AF elliptic cone-shaped via hole is configured to allow the finger junction of the F dual-channel soft-bodied finger 1F to pass there-through.

The G Airflow Conducting Valve 4G

As illustrated in FIG. 4 and FIG. 4A, the G airflow conducting valve 4G is constituted by a G upper valve head 4G1 and a G lower valve head 4G2; a G charging connector 2G is mounted on the G upper valve head 4G1; a finger junction of the G dual-channel soft-bodied finger 1G is mounted below the G lower valve head 4G2.

The G upper valve head 4G1 has the same structure with the A upper valve head 4A1, and will be explained with reference to FIG. 2D illustrating the A upper valve head 4A1. One end of the G upper valve head 4G1 is provided with an AG threaded hole for mounting the G charging connector 2G the AG threaded hole is disposed on an AG air channel; the other end of the G upper valve head 4G1 is provided with an AG elliptic cone-shaped convex lip; an upper valve panel of the G upper valve head 4G1 is fixedly connected to a lower valve panel of the G lower valve head 4G2 through screw. It can be seen from the cross-sectional structure of the G upper valve head 4G1 that, a central portion of the G upper valve head 4G1 is provided with the AG air channel; one end of the AG air channel is the AG threaded hole, and the other end of the AG air channel is the AG elliptic cone-shaped convex lip. The AG elliptic cone-shaped convex lip is inserted in the finger junction of the G dual-channel soft-bodied finger 1G.

The G lower valve head 4G2 has the same structure with the A lower valve head 4A2, and will be explained with reference to FIG. 2D illustrating the A lower valve head 4A2. One end of the G lower valve head 4G2 is a lower valve panel which is fixedly connected with the upper valve panel of the G upper valve head 4G1 through screw; the other end of the G lower valve head 4G2 is an AG hollow cone-shaped body. It can be seen from the cross-sectional structure of the G lower valve head 4G2 that, a central portion of the G lower valve head 4G2 is provided with an AG elliptic cone-shaped via hole and an AG inner boss; the AG inner boss is configured to support a convex annular-shaped body of the finger junction of the G dual-channel soft-bodied finger 1G. The AG elliptic cone-shaped via hole is configured to allow the finger junction of the G dual-channel soft-bodied finger 1G to pass there-through.

The H Airflow Conducting Valve 4H

Referring to FIG. 4 and FIG. 4A, the H airflow conducting valve 4H is constituted by a H upper valve head 4H1 and a H lower valve head 4H2; a H charging connector 2H is mounted on the H upper valve head 4H1; a finger junction of the H dual-channel soft-bodied finger 1H is mounted below the H lower valve head 4H2.

The H upper valve head 4H1 has the same structure with the A upper valve head 4A1, and will be explained with reference to FIG. 2D illustrating the A upper valve head 4A1. One end of the H upper valve head 4H1 is provided with an AH threaded hole for mounting the H charging connector 2H, the AH threaded hole is disposed on an AH air channel; the other end of the H upper valve head 4H1 is provided with an AH elliptic cone-shaped convex lip; an upper valve panel of the H upper valve head 4H1 is fixedly connected to a lower valve panel of the H lower valve head 4H2 through screw. It can be seen from the cross-sectional structure of the H upper valve head 4H1 that, a central portion of the H upper valve head 4H1 is provided with the AH air channel; one end of the AH air channel is the AH threaded hole, and the other end of the AH air channel is the AH elliptic cone-shaped convex lip. The AH elliptic cone-shaped convex lip is inserted in the finger junction of the H dual-channel soft-bodied finger 1H.

The H lower valve head 4H2 has the same structure with the A lower valve head 4A2, and will be explained with reference to FIG. 2D illustrating the A lower valve head 4A2. One end of the H lower valve head 4H2 is a lower valve panel which is fixedly connected with the upper valve panel of the H upper valve head 4H1 through screw; the other end of the H lower valve head 4H2 is an AH hollow cone-shaped body. It can be seen from the cross-sectional structure of the H lower valve head 4H2 that, a central portion of the H lower valve head 4H2 is provided with an AH elliptic cone-shaped via hole and an AH inner boss; the AH inner boss is configured to support a convex annular-shaped body of the finger junction of the H dual-channel soft-bodied finger 1H. The AH elliptic cone-shaped via hole is configured to allow the finger junction of the H dual-channel soft-bodied finger 1H to pass there-through.

The I Airflow Conducting Valve 4I

As illustrated in FIG. 4 and FIG. 4A, the I airflow conducting valve 4I is constituted by an I upper valve head 4I1 and an I lower valve head 4I2; an I charging connector 2I is mounted on the I upper valve head 4I1; a finger junction of the I dual-channel soft-bodied finger 1I is mounted below the I lower valve head 4I2.

The I upper valve head 4I1 has the same structure with the A upper valve head 4A1, and will be explained with reference to FIG. 2D illustrating the A upper valve head 4A1. One end of the I upper valve head 4I1 is provided with an AI threaded hole for mounting the I charging connector 2I, the AI threaded hole is disposed on an AI air channel; the other end of the I upper valve head 4I1 is provided with an AI elliptic cone-shaped convex lip; an upper valve panel of the I upper valve head 4I1 is fixedly connected to a lower valve panel of the I lower valve head 4I2 through screw. It can be seen from the cross-sectional structure of the I upper valve head 4I1 that, a central portion of the I upper valve head 4I1 is provided with the AI air channel; one end of the AI air channel is the AI threaded hole, and the other end of the AI air channel is the AI elliptic cone-shaped convex lip. The AI elliptic cone-shaped convex lip is inserted in the finger junction of the I dual-channel soft-bodied finger 1I.

The I lower valve head 4I2 has the same structure with the A lower valve head 4A2, and will be explained with reference to FIG. 2D illustrating the A lower valve head 4A2. One end of the I lower valve head 4I2 is a lower valve panel which is fixedly connected with the upper valve panel of the I upper valve head 4I1 through screw; the other end of the I lower valve head 4I2 is an AI hollow cone-shaped body. It can be seen from the cross-sectional structure of the I lower valve head 4I2 that, a central portion of the I lower valve head 4I2 is provided with an AI elliptic cone-shaped via hole and an AI inner boss; the AI inner boss is configured to support a convex annular-shaped body of the finger junction of the I dual-channel soft-bodied finger 1I. The AI elliptic cone-shaped via hole is configured to allow the finger junction of the I dual-channel soft-bodied finger 1I to pass there-through.

The soft-bodied robot as designed in the present invention can be mounted on an apparatus in the industrial automatic production line and used as an end-effector thereof.

The foregoing are merely illustrative embodiments of the present disclosure without limiting the present disclosure thereto. Those skilled in the art would obviously conceive of various modifications and alternatives without departing from the scope and sprint of the present disclosure, which modifications and alternatives shall also be fallen within the scope of protection of the present disclosure. Therefore, the scope of protection of the present disclosure should be defined by the appended claims.

What is claimed is:

1. A dual-channel soft-bodied finger comprising a fingertip, a finger junction, and a fingerboard, wherein:
  a plurality of flexible joints and a plurality of flexible shoulders are disposed at intervals on an upper portion of the fingerboard between the fingertip and the finger junction;
  a lower portion of the fingerboard is provided with a plurality of protrusions;
  an end portion of the finger junction is a convex annular-shaped body;
  a transition segment between the end portion of the finger junction and the flexible joints is a cone-shaped body;
  a first air channel and a second air channel are disposed inside the finger, and when the first and second air channels are inflated, air is guided into an air bag through the first and second air channels, the first and second air channels continuously communicate with the air bag and with each other to inflate or deflate the first and second channels with the same pressure, and
  a joint supporter disposed on the flexible joints.

2. The dual-channel soft-bodied finger according to claim 1, wherein the dual-channel soft-bodied finger is made of silicone rubber.

3. The dual-channel soft-bodied finger according to claim 1, wherein a width and a length of the dual-channel soft-bodied finger satisfy a relational expression of $b=4a/15$, wherein "a" is a length of the dual-channel soft-bodied finger, and "b" is a width of the dual-channel soft-bodied finger.

4. The dual-channel soft-bodied finger according to claim 1, wherein the protrusions have a wavy-line shape.

5. The dual-channel soft-bodied finger according to claim 1, wherein both a structural body of the fingertip and an empty chamber inside the fingertip are gradually converged towards the fingertip.

6. A soft-bodied robot comprising at least two dual-channel soft-bodied fingers according to claim 1, at least two airflow conducting valves, at least two charging connectors, and a holder, wherein:
the holder includes a mounting panel which can be secured to an external device and at least two support arms, each of the support arms being configured to be connected to one of the airflow conducting valves;
each of the airflow conducting valves comprises an upper valve head and a lower valve head, one of the charging connectors is mounted on the upper valve head, and a finger junction of the dual-channel soft-bodied finger is mounted below the lower valve head;
one end of the upper valve head has a threaded hole for mounting the charging connector, the other end of the upper valve head is provided with an elliptic cone-shaped convex lip, an upper valve panel of the upper valve head is fixedly connected to a lower valve panel of the lower valve head with a screw, a central portion of the upper valve head is provided with air channels, and the elliptic cone-shaped convex lip is inserted into an air inlet of the finger junction of the dual-channel soft-bodied finger; and
one end of the lower valve head is the lower valve panel, the other end of the lower valve head is a hollow cone-shaped body, an inside of the lower valve head is provided with an elliptic cone-shaped via hole and an inner boss, the inner boss is configured to support a convex annular-shaped body of the finger junction of the dual-channel soft-bodied finger, and the elliptic cone-shaped via hole is configured to allow the finger junction of the dual-channel soft-bodied finger to pass therethrough.

7. The soft-bodied robot according to claim 6, wherein the at least two support arms are distributed along a circumference of the holder.

8. The soft-bodied robot according to claim 6, wherein the cone-shaped body of the transition segment is clamped between the elliptic cone-shaped convex lip and the elliptic cone-shaped via hole, and the convex annular-shaped body of the end portion is fixedly limited inside the inner boss.

9. The dual-channel soft-bodied finger according to claim 1, wherein both of a cross-sectional area and a volume of the air bag are larger than that of each air channel.

10. The dual-channel soft-bodied finger according to claim 1, wherein the joint supporter is disposed on the fingerboard and is between the first and second air channels.

* * * * *